United States Patent
Kobayashi

(10) Patent No.: US 6,449,435 B1
(45) Date of Patent: Sep. 10, 2002

(54) FINDER DEVICE FOR A CAMERA

(75) Inventor: Yoshiaki Kobayashi, Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/686,606

(22) Filed: Oct. 11, 2000

(30) Foreign Application Priority Data

Oct. 15, 1999 (JP) .......................................... 11-294062

(51) Int. Cl.$^7$ ........................ G03B 17/18; G03B 17/20
(52) U.S. Cl. ...................... 396/147; 396/287; 396/296
(58) Field of Search ................................. 396/147, 148, 396/281, 287, 288, 289, 290, 291, 292, 296, 373

(56) References Cited

U.S. PATENT DOCUMENTS 4,372,657 A  *  2/1983  Iwata et al. ................. 396/287
6,002,887 A  * 12/1999  Chiba et al. ................. 396/232
6,078,755 A  *  6/2000  Ishimaru et al. ............ 396/287

FOREIGN PATENT DOCUMENTS

JP          764154      *  3/1995

* cited by examiner

Primary Examiner—Russell Adams
Assistant Examiner—Arthur A Smith
(74) Attorney, Agent, or Firm—Straub & Pokotylo; John C. Pokotylo

(57) ABSTRACT

A camera includes a finder optical system. A transmissivity variable element is arranged in the finder optical system and changes the light transmissivity. A release signal outputting circuit outputs a release signal. A light exposure mechanism effects a light exposure operation in accordance with the release signal from the release signal outputting circuit. A control circuit effects control such that, after the outputting of the release signal but before the start of the light exposure operation by the light exposure mechanism, the transmissivity of the finder optical system is made lower by the transmissivity variable element.

7 Claims, 12 Drawing Sheets

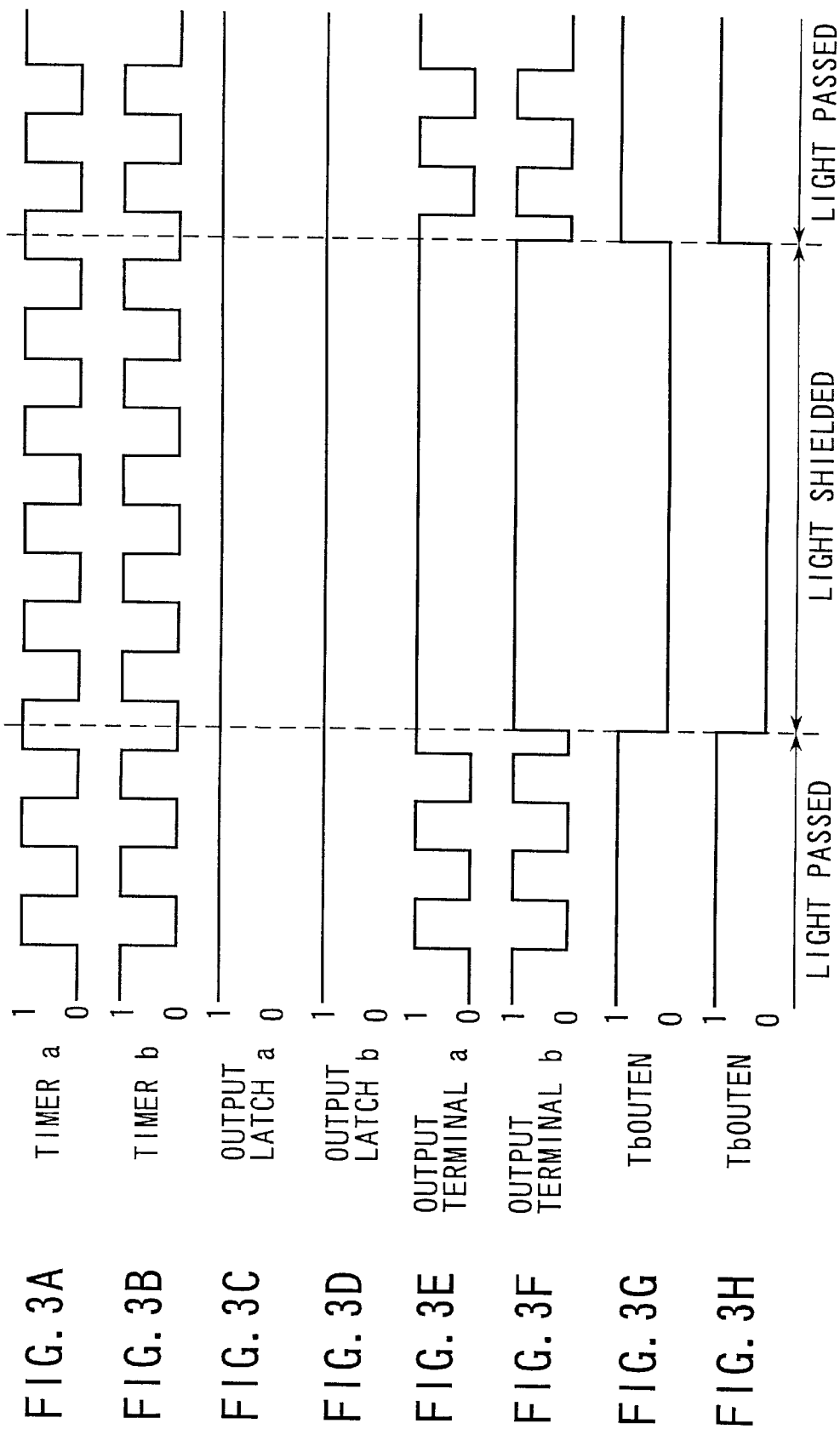

FINDER DEVICE FOR A CAMERA

CROSS-REFERENCE TO RELATED APPLICATIONS

This application is based upon and claims the benefit of priority from the prior Japanese Patent Application No. 11-294062, filed Oct. 15, 1999, contents of which are incorporated herein by reference.

BACKGROUND OF THE INVENTION

The present invention relates to a finder device for a camera and, in particular, to a camera having, within a finder, a display unit capable of knowing an exposure timing.

Conventionally known is a camera having, within a finder, a display unit capable of knowing an exposure timing. JPN PAT APPLN KOKAI PUBLICATION NO. 7-64154 discloses such a camera in which, by a light exposure start timing a finder image disappears electrically or mechanically. This has the same effect as the disappearing of a finder image resulting from the mirror-up of a single-lens reflex camera, enabling the user to know an exposure timing.

In the conventional technique including the above-mentioned JPN PAT APPLN KOKAI PUBLICATION NO. 7-64154, if such a finder image disappears during the light exposure, then it is impossible to confirm the finder image and, even if a subject moves, for example, during the light exposure, there is a problem that the photographer will not be aware of this movement.

BRIEF SUMMARY OF THE INVENTION

It is accordingly the object of the present invention to provide a finder device for a camera which enables a photographer to know a light exposure start timing and check the state of a subject during a light exposure.

In order to achieve the above-mentioned object, there is provided a camera, in one aspect of the present invention, which comprises: a finder optical system; a transmissivity variable element arranged in the finder optical system and making a light transmissivity variable; a release signal outputting circuit for outputting a release signal; a light exposure mechanism for performing a light exposure operation in accordance with the release signal from the release signal outputting circuit; and a control circuit for effecting control such that, after the outputting of the release signal but before the starting of the light exposure operation by the light exposure mechanism, the transmissivity of the finder optical system is made lower by the transmissivity variable element.

In a second aspect of the present invention there is provided a camera comprising: a finder optical system; a transmissivity variable element arranged in the finder optical system and making a light transmissivity variable; a release signal outputting circuit for outputting a release signal; a distance measuring mechanism for measuring a distance to a subject in accordance with the release signal from the release signal outputting circuit; a lens drive mechanism for driving a picture taking lens in accordance with the distance measured by the distance measuring mechanism; a light exposure mechanism for effecting a light exposure operation after the driving of the picture taking lens is ended; and a control circuit for effecting control such that, during the driving of the picture taking lens, the transmissivity of the finder optical system is made lower by the transmissivity variable element.

In a third aspect of the present invention, there is provided a camera comprising: a finder optical system; a transmissivity variable element arranged in the finder optical system and making a light transmissivity variable; a release signal outputting circuit for outputting a release signal; a shutter; a shutter detection circuit for detecting the opening of the shutter and outputting a signal; and a control circuit for lowering the transmissivity of the finder optical system by the transmissivity variable element in accordance with the release signal from the release signal outputting circuit and returning the transmissivity of the finder optical system to an initial transmissivity in accordance with the output signal of the shutter detection circuit.

In a fourth aspect of the present invention, there is provided a camera comprising: a finder optical system; a display element arranged in the finder optical system; a release signal outputting circuit for outputting a release signal; an exposure mechanism for effecting a light exposure operation in accordance with the release signal from the release signal outputting circuit; and a control circuit for effecting control such that, after the outputting of the release signal from the release signal outputting circuit but before the start of the light exposure operation by the light exposure mechanism, a display state of the display element is changed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A to 3H are a timing chart showing an operation of an LCD control signal outputting means;

DETAILED DESCRIPTION OF THE INVENTION

One embodiment of the present invention will be described below with reference to the drawings.

Figure 1:
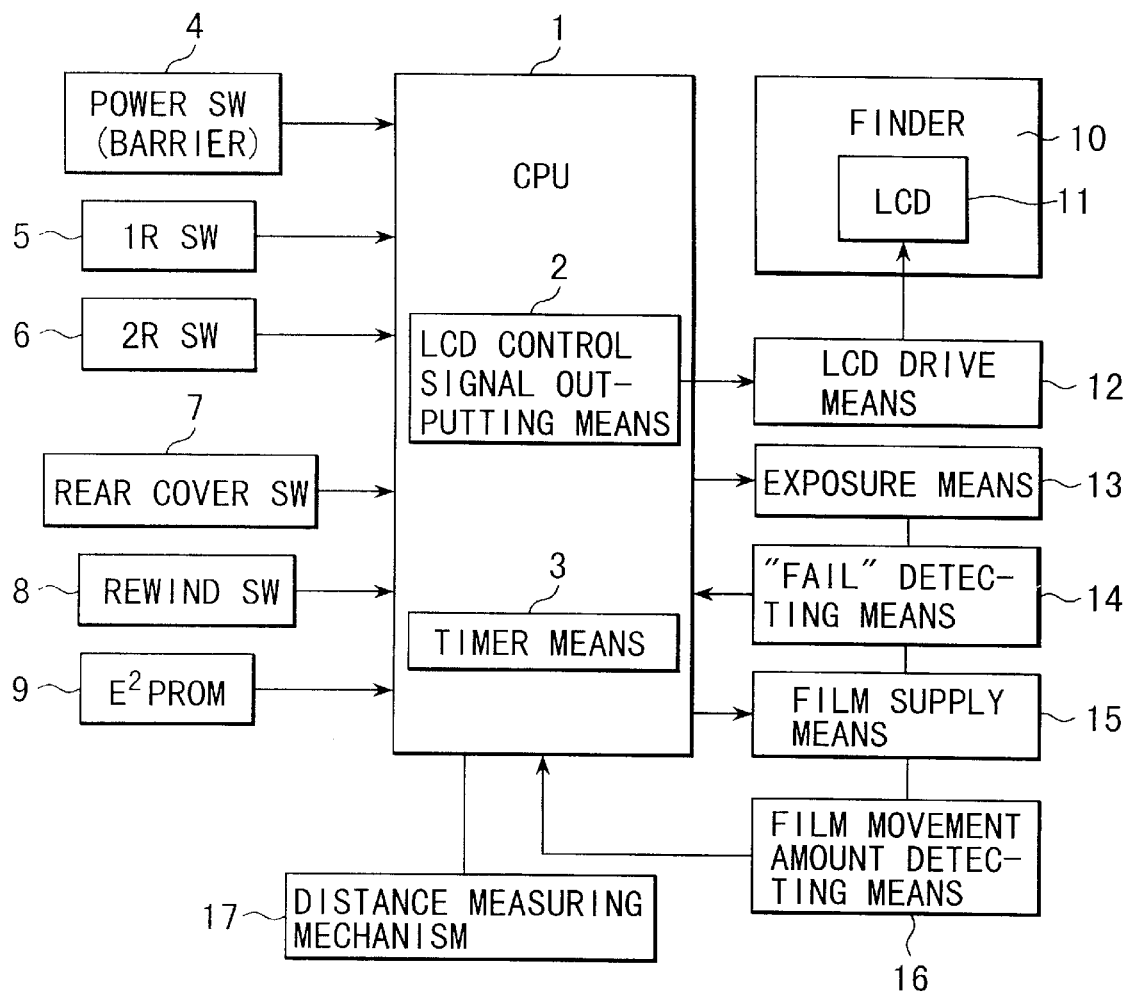
FIG. 1 is a concept diagram of a camera to which one embodiment of the present invention is applied.

FIG. 1 is a concept diagram of a camera applied to one embodiment of the present invention. In FIG. 1, a CPU 1 controls various kinds of operations of the camera and includes a LCD control signal outputting means 2 and timer means 3. The LCD control signal outputting means 2 outputs a control signal to an LCD drive means 12 for driving an LCD (liquid display unit) 11 provided within a finder 10.

The CPU 1 is connected to a power switch 4, 1R switch 5 and 2R switch 6 (release signal output means), rear cover switch 7 and rewind switch 8, as a switching means, a film exposure means 13, a "fail" detecting means 14 for detecting a failure of the film exposure means 13, film supply means 15, a film movement amount detecting means 16, distance measuring mechanism 17, EEPROM 9, etc.

The exposure means 13 includes an exposure start judging means and exposure completion judging means and the CPU 1 counts an exposure time with the use of the timer means 3 and performs an exposure operation. The "fail" detecting means 14 includes a film winding means and film rewinding means and performs a film auto-loading operation, one-frame film winding operation and film rewinding operation. The film movement amount detecting means 16 detects a movement amount of the film supplied by the film supply means 15.

Figure 2:
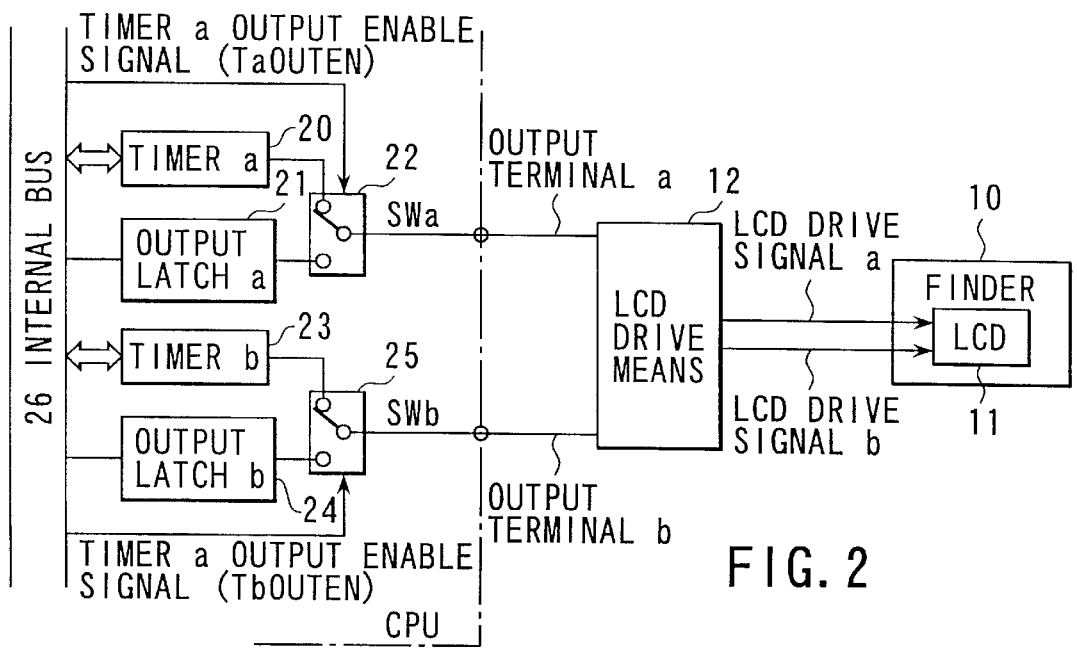
FIG. 2 is a practical schematic diagram of an LCD control signal outputting means.

A detail of the LCD control signal outputting means 2 will be explained below with the use of FIG. 2. The LCD control signal outputting means 2 includes a timer a 20, output latch a 21, SW a 22, timer b 23, output latch b 24 and SW b 25.

The timer a 20 and timer b 23 generate a 50%-duty V pulse each and the output of the timer b 23 is so set by a software through an internal data bus 26 as to provide a 90° phase-shifted pulse with respect to the output of the timer a 20.

The output latch a 21 and output latch b 24 have 1 or 0 data set by the software through the internal data bus 26. A H level signal is output with the 1 set and a L level signal is output with the 0 set. According to the present embodiment, the output latch a 21 and output latch b 24 have 1 set at all times.

SW a 22 is controlled by a timer a output enable signal (TaOUTEN) and selects either of the output of the timer a 20 and output of the output latch a 21, and outputs V it to an output terminal a. Stated in more detail, when TaOUTEN=1, the output of the timer a 20 is selected and, when TaOUTEN=0, the output of the output latch a 21 is selected. Similarly, SW b 25 is controlled by a timer output enable signal (TbOUTEN) and selects either of the output of the timer b 23 and output of the output latch b 24 and outputs it to an output terminal b.

An LCD drive means 12 allows the H levels of those signals which are input through the output terminal a and output terminal b to be converted to drive voltages of the LCD 11 and outputs corresponding LCD drive signal a and LCD drive signal b to the LCD 11.

Here, when the LCD drive signal a and LCD drive signal b are at the same potential, the LCD 11 becomes a light shielding state. When, on the other hand, the LCD drive signal a and LCD drive signal b have a potential difference, the LCD becomes a light transmissive state.

As evident from the above, the LCD control signal outputting means 2 in the CPU 1 has the function of effecting such transmissivity control as to, before a light exposure operation, make lower the transmissivity of a finder optical system by the LCD 12 as a transmissivity variable means and, at substantially the same time as the light exposure operation, return the transmissivity of the finder optical system back to an initial one.

FIGS. 3A to 3H is a timing chart showing the operation of the LCD control signal outputting means. With the TaOUTEN and TbOUTEN in a 1 state, the outputs of the timer a 20 and timer b 23 are supplied to the output terminal a and output terminal b to allow the LCD 11 to become a transmissive state. With the TaOUTEN and TbOUTEN in a 0 state, the outputs of the output latch a and output latch b are supplied to the output terminal a and output terminal b to allow the LCD 11 to become a light shielding state.

Figure 4:
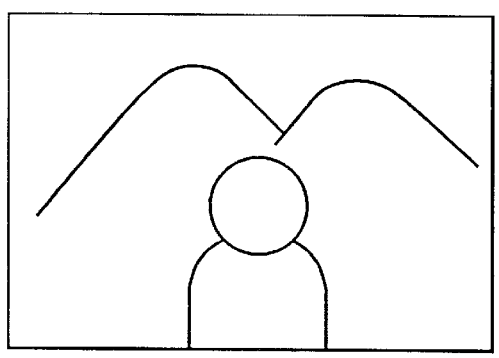
FIG. 4 is a view showing one example of an image when an intra-F LCD is in a light transmissive state.
Figure 5:
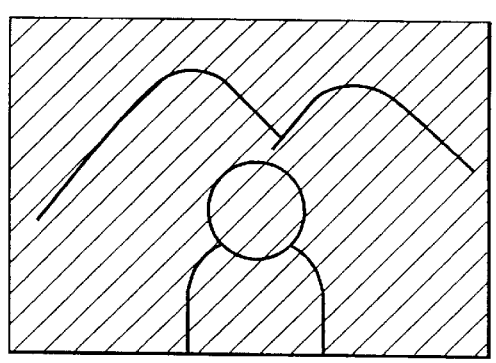
FIG. 5 is a view showing one example when the intra-F LCD is in a non-transmissive state.

FIG. 4 shows a finder image when the LCD 11 becomes a transmissive state and FIG. 5 shows a finder image when the LCD 11 becomes a light shielding state.

Figure 6:
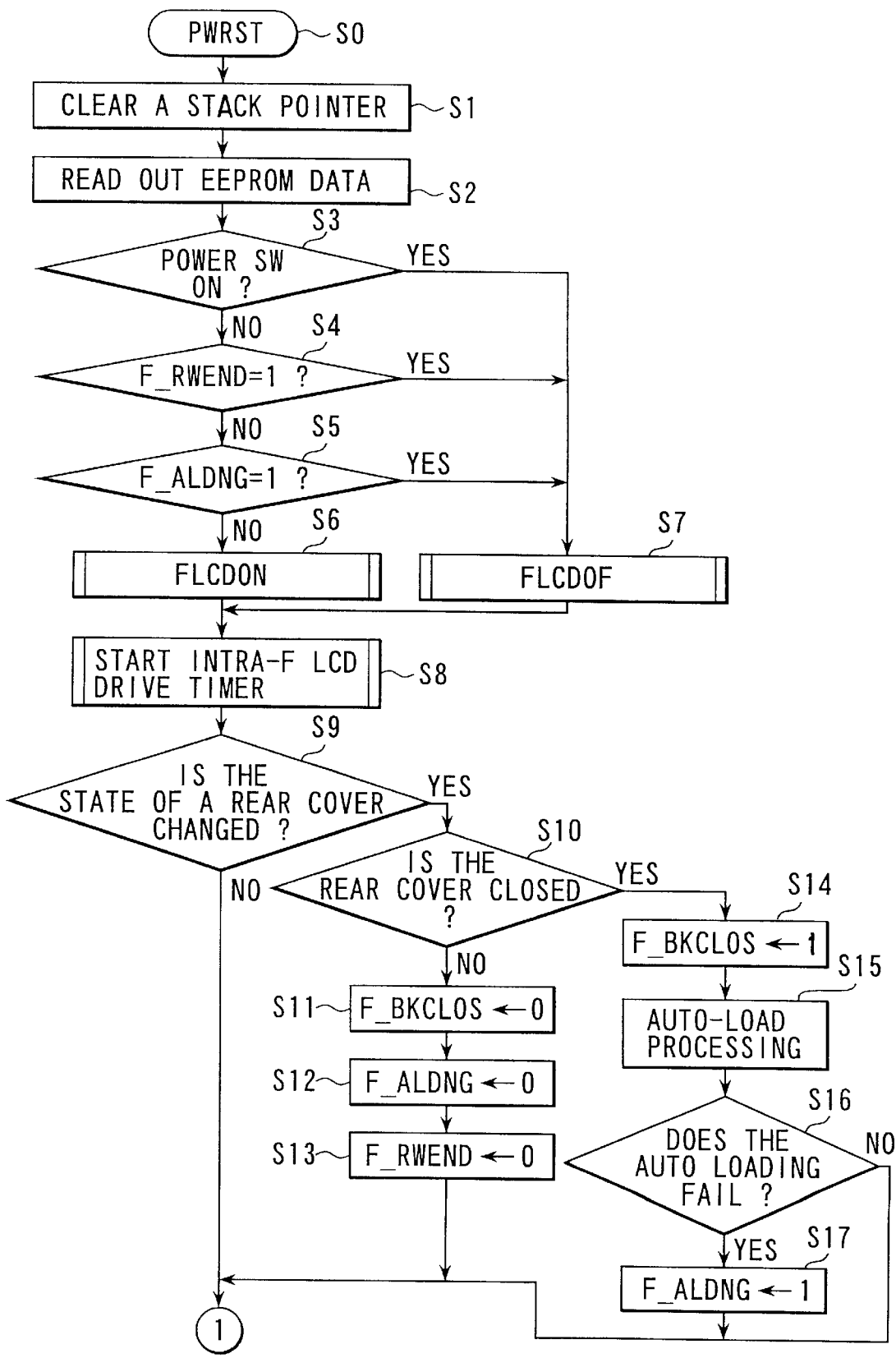
FIG. 6 is a flow chart for explaining a portion of a main flow of the camera.

The main flow of the camera of the present embodiment will be explained in more detail below with reference to FIGS. 6, 7 and 8. In FIG. 6, an interruption occurs by a change of the power switch or rear cover switch. Processing starts at step S0 (PWRST). At step S1, a stack pointer is cleared and a stack level is initialized. Then adjusting data necessary to the control of the camera and data representing the state of the camera are read out from the EEPROM 9 at step S2 and developed onto a RAM.

At step S3, the state of the power switch is read in and, if ON, control goes to step S4 and checking is made to see whether or not a flag F_RWEND=1. The flag F_RWEND becomes 1 at an end of rewinding and becomes 0 if the rear cover is opened. If the flag F_RWEND is 0, control goes to step S5. At step S5, the state of a flag F_ALDNG is checked and the flag F_ALDNG becomes 1 if the auto-loading fails and becomes 0 if the rear cover is open. When the flag F_ALDNG=0, control goes to step S6 and a subroutine FLCDON is performed. The subroutine FLCDON sets the LCD 11 arranged within the finder in a transmissive state.

If at step S3 the power switch is in the OFF state, if at step S4 the flag F_RWEND is in the 1 state, or if at step S5 the flag F_ALDNG is in the 1 state, control goes to step S7 and a subroutine FLCDOF is performed. The subroutine FLCDOF sets the LCD 11 arranged within the finder in a light shielding state.

Then control goes to step 8 and a start of a timer for LCD drive in the subroutine is effected and, if the subroutine FLCDON is implemented, the LCD 11 becomes actually in a transmissive state.

When, by performing steps S3 to S8, the power switch is in the ON state, rewinding is not in a completed state and auto-loading does not "fail", the LCD 11 is in the transmissive state and, otherwise, the LCD 11 is so controlled as to become a light shielding state.

Then control goes to step S9 and checking is made to see whether or not a program is started by the change of the state of the rear cover switch. In the case where the program is started by the change of the rear cover switch, control goes to step S10. At step S10, judgment is made as to whether or not the rear cover switch changed is in a closed state. If YES, control goes to step S14. If the switch is in an opened state, control goes to step S11.

At step S11, a flag F_BKCLOS becomes 0 and the open state of the rear cover is stored. Then control goes to step S12 and the flag F_ALDNG is set to 0 and the "fail" state of the auto-loading is cancelled. Then control goes to step S13 and the flag F_RWEND is set to 0 and a rewind complete state is cancelled.

At step S14, on the other hand, the flag F_BKCLOS is set to 1 and the closed state of the rear cover is stored. Then, at step S15, auto-load processing is performed and, at step S16, judgment is made as to whether or not the auto-loading fails and, if YES, control goes to step S17 and the flag F_ALDNG is set to 1 and the "fail" state of the auto-loading is stored.

Figure 7:
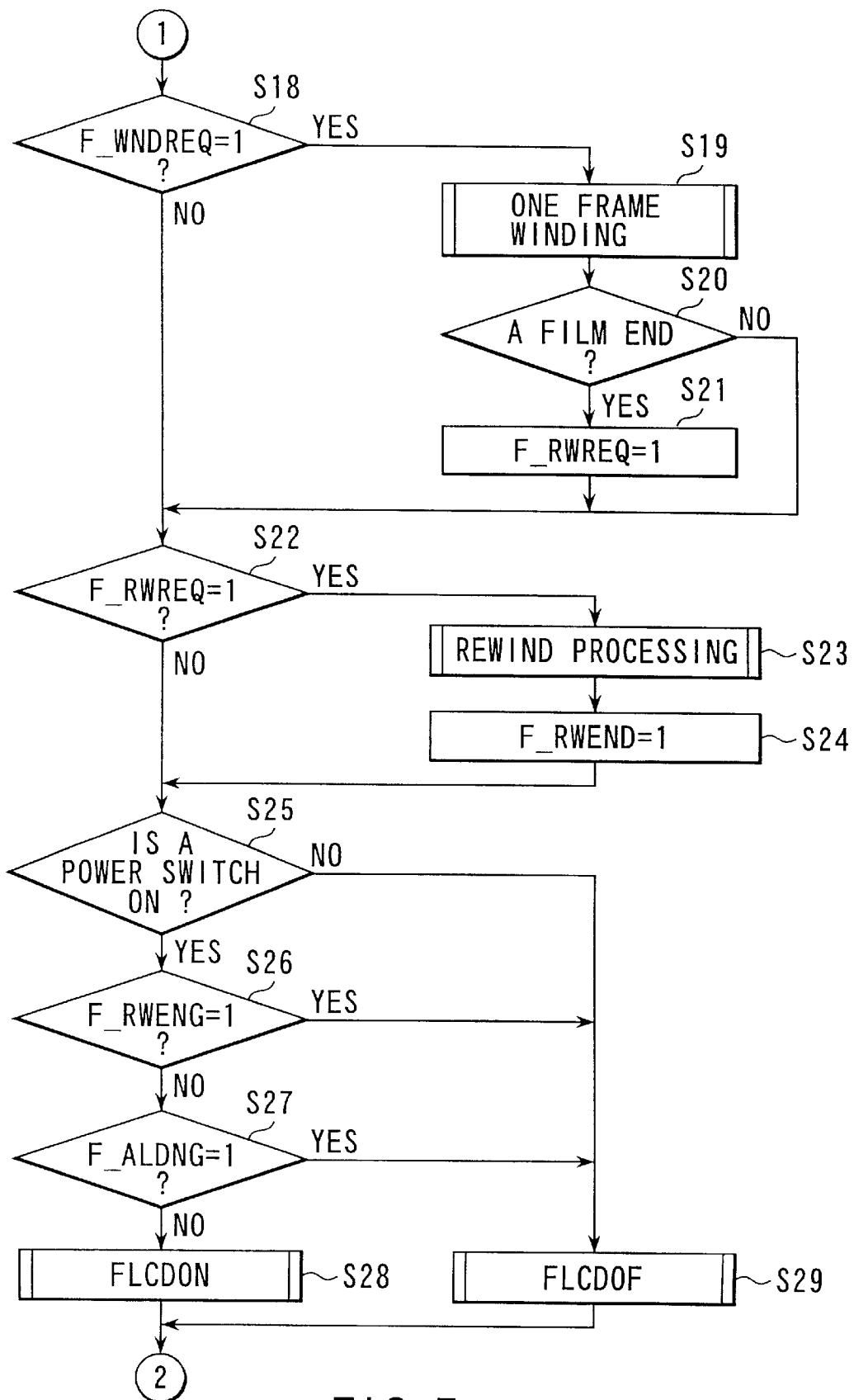
FIG. 7 is a flow chart for explaining a portion of the main flow of the camera.

Then control goes to step S18 in FIG. 7 and the state of a flag F_WNDREQ is checked. The flag F_WNDREQ becomes 1 when it is necessary to perform one-frame film winding and becomes 0 after the one-frame film winding operation has been done. If, at step S18, F_WNDREQ=1, control goes to S19 and one-frame film winding is done. After this operation the flag F_WNDREQ becomes 0.

Then control goes to step S20 and judgment is made as to whether or not a film end is detected as a result of the one-frame film winding. If the film end is detected, control goes to step S21 and the flag F_RWREQ is set to 1 and there exists a "rewind request" present.

After step S21 or if NO at step S18, control goes to step S22 and the state of the flag F_RWREQ is checked. The flag F_RWREQ represents "there exists a rewind request" and becomes 1 when, by the one-frame film winding operation, a film end is detected or a forced rewinding switch is depressed with the rear cover closed and becomes 0 when the rewind operation is completed. In the case where, at step S22, the flag F_RWREQ is set to 1, control goes to step S23 and the rewind processing is performed. When the rewind processing is completed, the flag F_RWREQ becomes 0. Then at step S24 the flag F_RWEND becomes 1 and the rewind operation completed state is stored.

The processing at steps S25 to S29 is the same as the processing at steps S3 to S7 as set out above and the operative state of the LCD 11 is updated in accordance with a camera state updated between step S9 and step S24.

Figure 11:
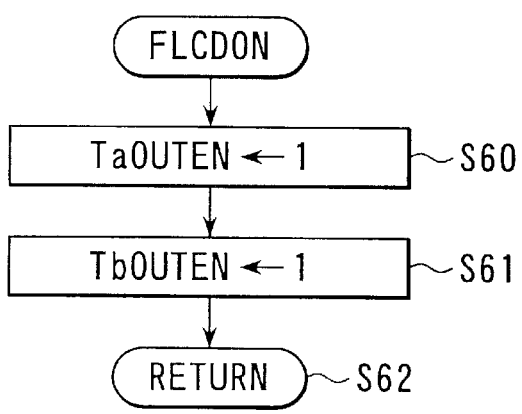
FIG. 11 is a flow chart for explaining a detail of processing by which the intra-F LCD is set to a transmissive state.
Figure 12:
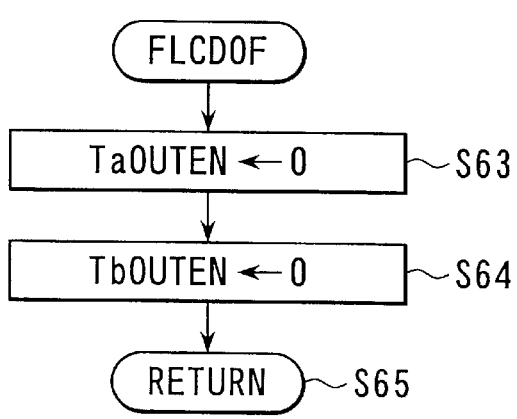
FIG. 12 is a flow chart for explaining a detail of processing by which the intra-F LCD is set to a light shielding state.

Here, the above-mentioned subroutine FLCDON (step S6 in FIG. 6 and step S28 in FIG. 7) and subroutine FLCDOF (step S7 in FIG. 6 and step S29 in FIG. 7) are explained referring to FIGS. 11 and 12, respectively.

FIG. 11 shows a detail of the subroutine FLCDON. First, at step S60, TaOUTEN is set to 1, that is, a timer a output enable signal and an output of the timer a 20 in FIG. 2 is supplied to the output terminal a. Then at step S61, TbOUTEN is set to 1, that is, a timer b output enable signal and, after the output of the timer b 23 in FIG. 2 is supplied to the output terminal b, a return is made at step S62 and the subroutine is ended.

FIG. 12 shows a detail of the subroutine FLCDOF. First, at step S63, TaOUTEN is set to 0, that is, a timer a output enable signal and the output of the output latch a 21 in FIG. 2 is supplied to the output terminal a. Then at step S64, TbOUTEN is set to 0, that is, a timer b output enable signal and, after the output of the output latch b 21 in FIG. 2 is supplied to the output terminal b, a return is made at step S65 and the subroutine is ended.

Figure 9:
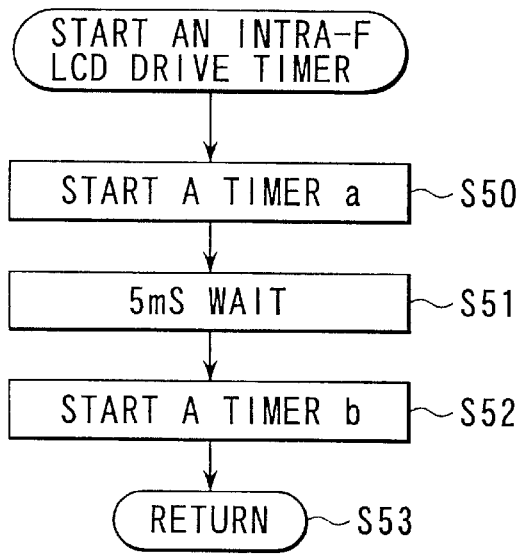
FIG. 9 is a flow chart for explaining a detail of intra-F LCD drive timer start processing.

A subroutine (step S8 in FIG. 6) of the above-mentioned intra-F LCD drive timer start will be explained below with the use of FIG. 9. First, the timer a is started at step S50. By doing so, a 100 Hz pulse is output from the timer a at a 50% duty ratio. Then, at step S51, a wait is made for a 5 mS corresponding to a ½ period of the output pulse of the timer a and, thereafter, the timer b is started at step S52. By doing so, a 100 Hz pulse is output from the timer b in a 50% duty ratio. Then, at step S53, a return is made and the subroutine is ended. Thus, by implementing the subroutine of the intra-F LCD drive timer start, a 100 Hz pulse output is generated with a 90° phase-shift with respect to each other.

Figure 10:
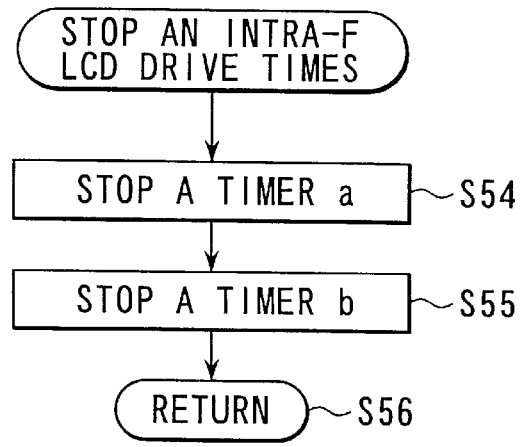
FIG. 10 is a flow chart for explaining a detail of intra-F LCD drive stop processing.

The subroutine of the intra-F LCD drive timer stop will be explained below with the use of FIG. 10. First, the timer a is stopped at step S54 and then the timer b is stopped at step S55. Then control goes to step S56 and a return is made and the sub-routine is ended.

Figure 8:
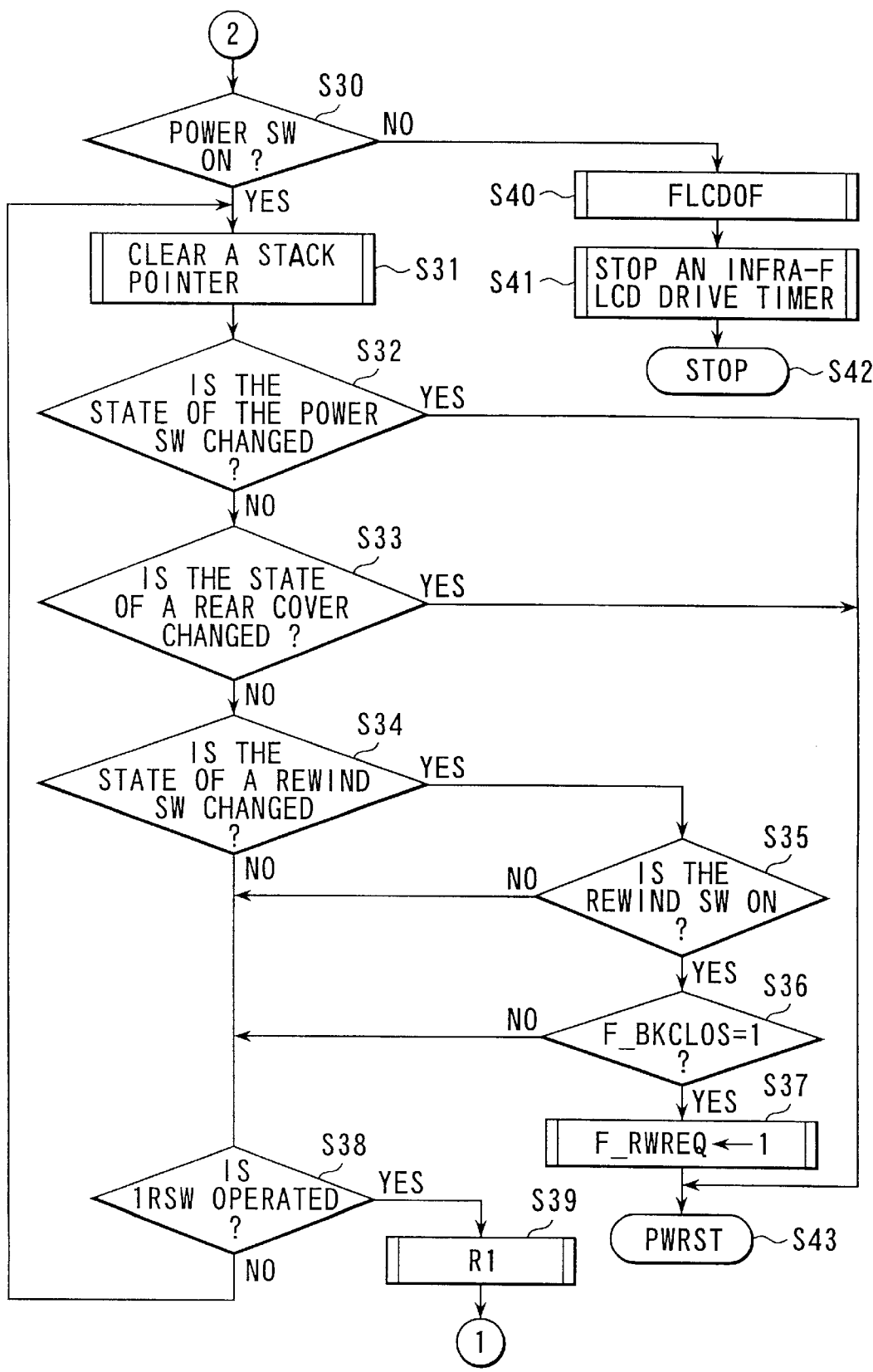
FIG. 8 is a flow chart for explaining a portion of the main flow.

FIG. 8 shows processing following that of FIG. 7. At step S30, checking is made to see whether or not the power switch is in an ON state. If on, control goes to step S31 and, if OFF, control goes to step S40. Since, at step S40, the camera power is in the OFF state, the above-mentioned subroutine FLCDOF is called and the LCD 11 is set in a light shielding state. Then, at step S41, the above-mentioned intra-F LCD drive timer stop processing is made to make a consuming current minimal. Then, at step S42, the CPU 1 is set to a stopped state.

In the case where, at step S30, the power switch is in the ON state, control goes to step S31 to clear a stack pointer. Then, at step S32, judgment is made to see whether or not there is any change in the state of the power switch. If there is a change, control goes to step S43 and a jump is made to the PWRST at step S0 in FIG. 6.

In the case where, at step S32, there is no change in the state of the power switch, control goes to step S33 and checking is made to see whether or not there is any change of the rear cover. In the case where there is a change, control goes to step S43 and a jump is made to the PWRST at step S0 IN FIG. 6. In the case where there is no change at step S33, control goes to step S34 and judgment is made to see whether or there is any change of the rewind switch. If there is a change, control goes to step S35 and judgment is made to see whether or not the changed state of the rewind switch is in the ON state. If OFF, control goes to step S38 and, if ON, control goes to step S36.

At step S36, judgment is made as to the state of an F_BKCLOS, that is, a flag showing a present state of the rear cover. If the F_BKCLOS is in a 1 state (the closed state of the back cover), control goes to step S37 and, after F_RWREQ is set to 1, that is, a flag representing a rewind request, a jump is made at step S43 to the PWRST which is step So in FIG. 6. Thus, when the rewind switch is changed to an ON state and the rear cover is in the closed state, then a rewind request is generated.

If, on the other hand, at step S36 the F_BKCLOS is in a 0 state, control goes to step S38. At step S38, judgment is made to see whether or not the 1R switch is operated. If it is operated, control goes to step S39 and a subroutine R1 of later-described release processing is called and control goes back to step S18 in FIG. 7. If, at step S38, the release switch is not operated, control goes back to step S31.

Figure 13:
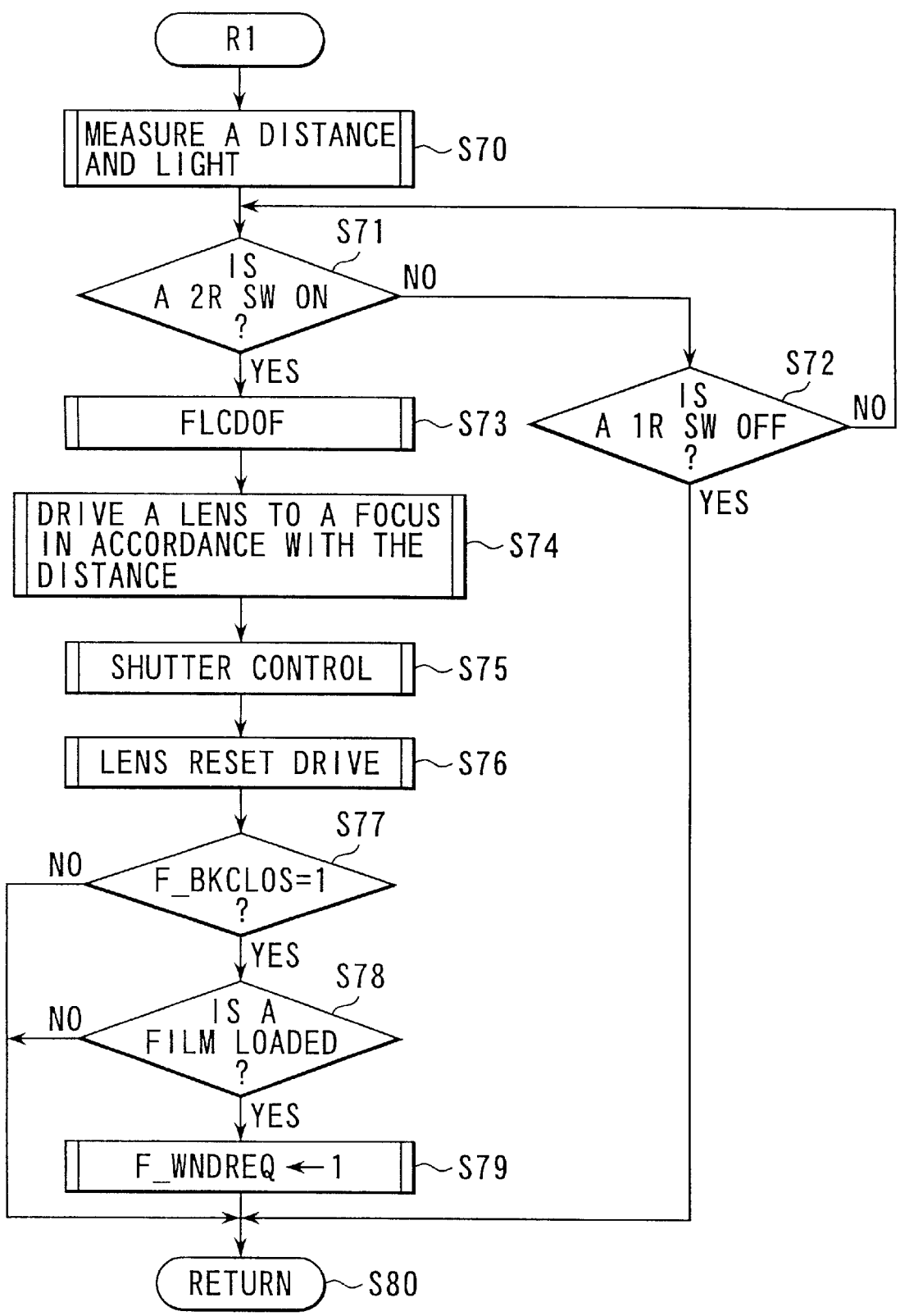
FIG. 13 is a flow chart for explaining a detail of release processing.

Hereinbelow, a subroutine R1 of the above-mentioned release processing will be described in more detail with reference to FIG. 13. First, at step S70 the measurements of a distance and light are carried out and an amount of driving of a picture taking lens to a just-in-focus position and shutter opening time for obtaining a correct amount of light exposure are found. Then at step S71 judgment is made to see whether or not the state of the 2R switch is read ON. If OFF, control goes to step S72 and judgment is made to see whether or not the 1R switch continues a read ON state. If, here, the 1R switch is in an OFF state, control goes to step S80 and a return is made without any light exposure operation. If, on the other hand, the ON state is continued, control goes back to step S71 to provide loop processing.

If at step S71 the 2R switch is turned ON, control goes to step S73 and the earlier-explained subroutine FLCDOF is called and the LCD 11 is set in a light shielding state. Then, at step S74, the drive control of the picture taking lens is made in accordance with the drive amount of the picture taking lens required at step S70. Then, at step S75, shutter control is effected as a light exposure operation for obtaining correct exposure light. In order to let the photographer recognize a light exposure control start during this shutter control, the LCD 11 is returned back to a transmissive state.

Then, at step S76, a lens reset drive is done so as to allow the picture taking lens in a just-in-focus state to be returned back to a reset position. Then, at step S77, judgment is made as to the state of the flag F_BKCLOS showing the state of the rear cover switch. With the F_BKCLOS in a 0 state (an open state of the rear cover), control goes to step S80 and the subroutine R1 is ended. With the F_BKCLOS in a 1 state (a closed state of the rear cover), control goes to step S78.

At step S78, judgment is made to see whether or not the film is loaded. If, here, the film is not loaded, control goes to step S80 and a return is made. If, on the other hand, the film is loaded, it is necessary to effect an one-frame winding operation and F_WNDREQ is set to 1, that is, a flag representing a one-frame winding operation request. And a return is made to step S80.

Figure 14:
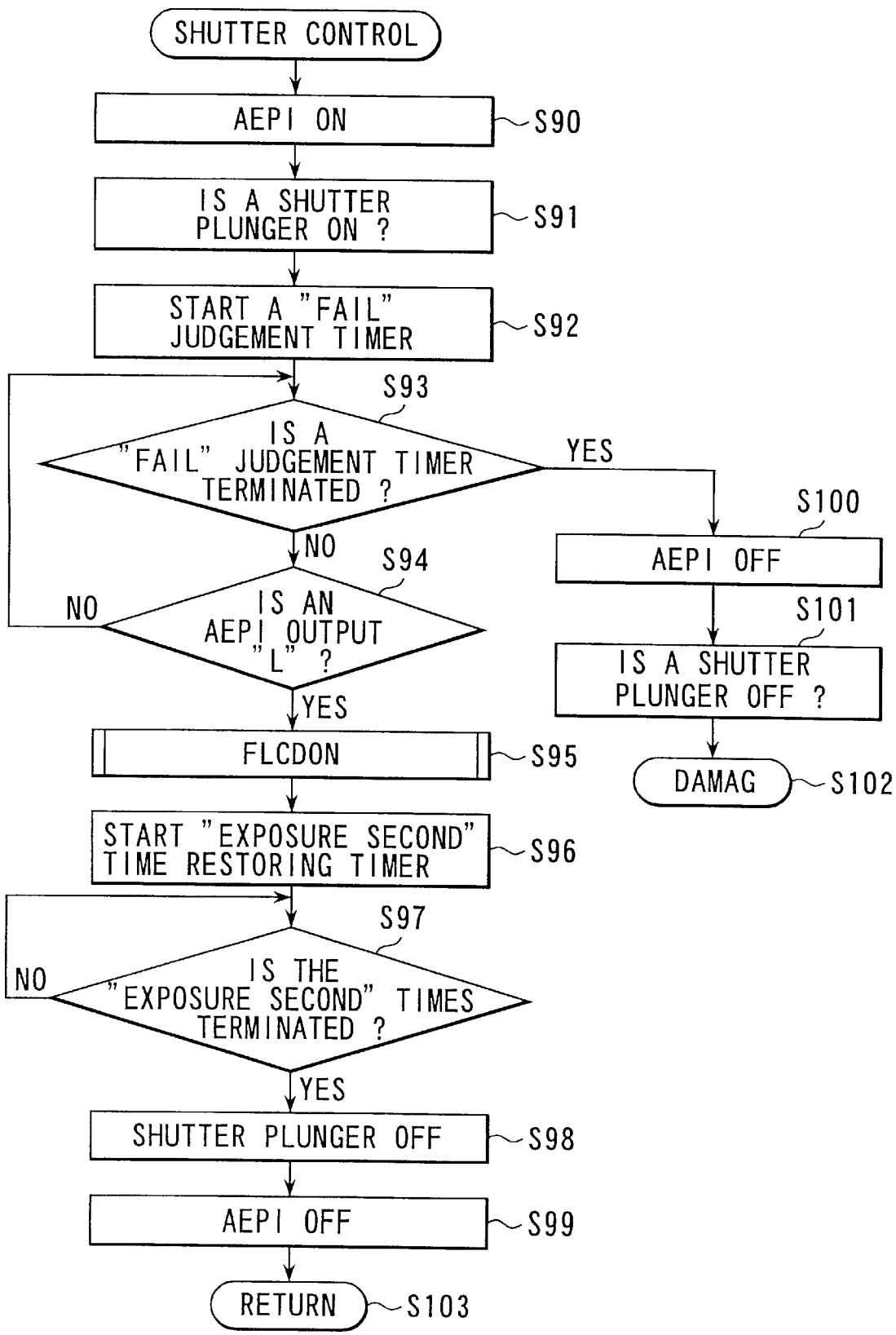
FIG. 14 is a flow chart for explaining a detail of shutter control.

Hereinbelow, the subroutine (step S75 in FIG. 13) of the shutter control will be described in more detail with the use of FIG. 14. First, at step S90, a photointerrupter AEPI for inverting an output when the shutter is beginning to be opened is turned ON to set an operative state. Then at step S91, a shutter plunger serving as a motive power source for opening the shutter is turned ON. Then at step S92, a "fail" judging timer for providing a reference time for judging the failure of the shutter is started.

Then, at step S93, judgment is made to see whether or not the "fail" judgment timer is terminated. When the "fail" judgment timer is terminated, control goes to step S100 and the AEPI is returned back to an OFF state. At the next step S101, the shutter plunger is turned OFF. Then, at step S102, a jump is made to a subroutine DAMAG, that is, processing in a failure in step S102.

In the case where, at step S93, the "fail" judging timer is not terminated, control goes to step S94. At step S94, judgment is made to see whether or not the output of the AEPI is in a "L" state. The output of the AEPI is set to a "H" state if the shutter is not opened and changed to the "L" state when the shutter is beginning to be opened. When the output of the AEPI is in the "H" state, control goes back to step S93. When the output of the AEPI is in the "L" state, control goes to the next step S95.

When, at step S95, the AEPI varies from the "H" state to the "L" state during a period from the ON time of the shutter plunger to the termination of the "fail" judging timer, judgment is made that the shutter is normal and, when the "fail" judgment timer is terminated with the AEPI kept in the "H" state, judgment is made that, since the shutter is not opened, a failure is involved. When the shutter is judged as being a "not-fail" state, at step S95, the subroutine FLCDON is executed so as to represent the start of the exposure, so that the LCD 11 is set in the transmissive state.

Then, at step S96, an "exposure second" time restoring timer for controlling an "exposure second" time is started and, at step S97, whether or not the "exposure second" time is terminated is judged by the termination of the "exposure second" time. When the "exposure second" time is terminated, control goes to step S98 and the shutter plunger is turned OFF to allow the shutter to be closed. After, at step S99, the AEPI is turned OFF, a return is made to step S103, thus ending the subroutine involved.

Thus, only when the shutter is not judged as being in a "fail" state under the shutter control, the LCD 11 is returned back to a transmissive state.

Figure 15:
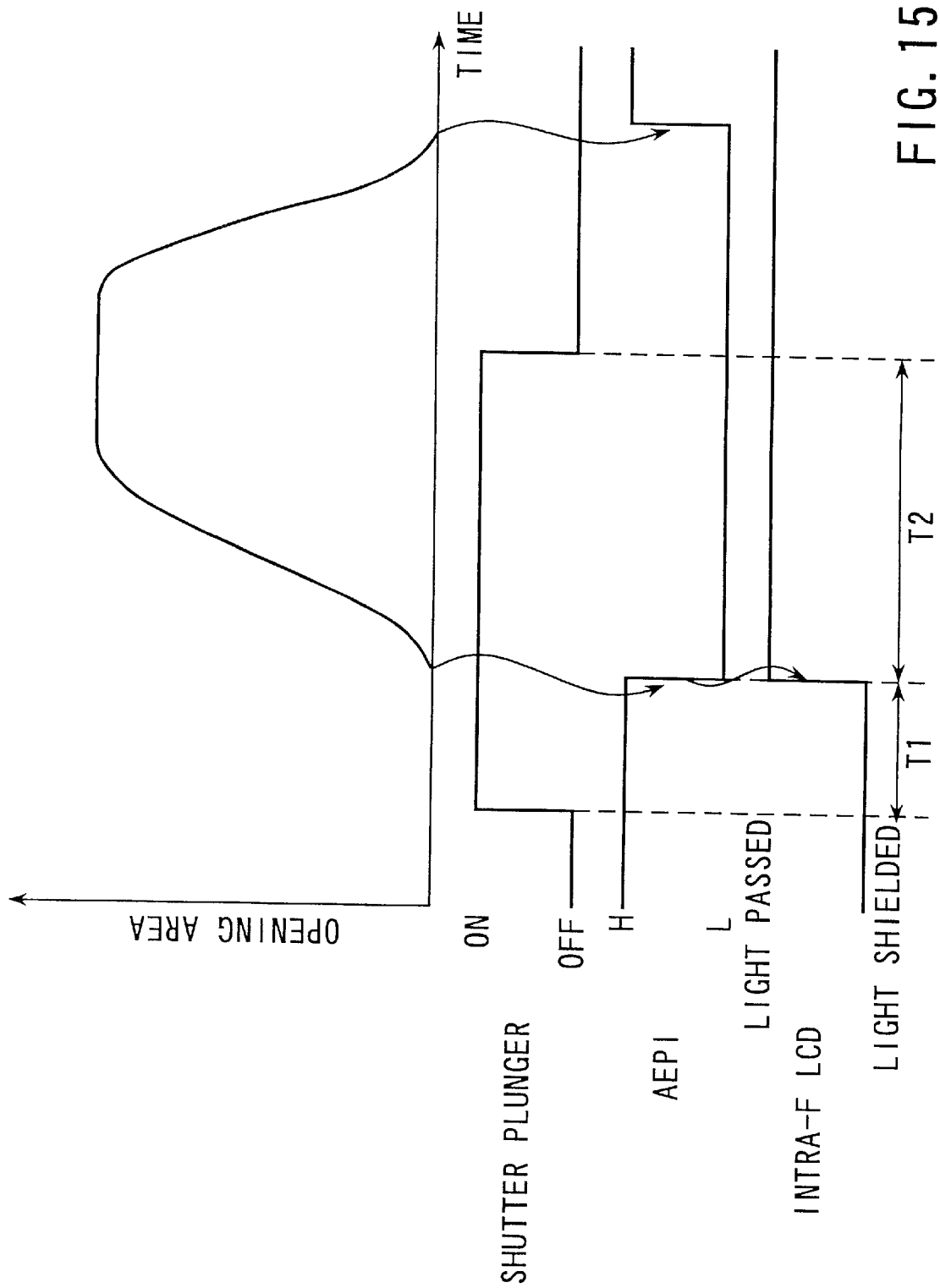
FIG. 15 is a timing chart of the shutter control.
Figure 16:
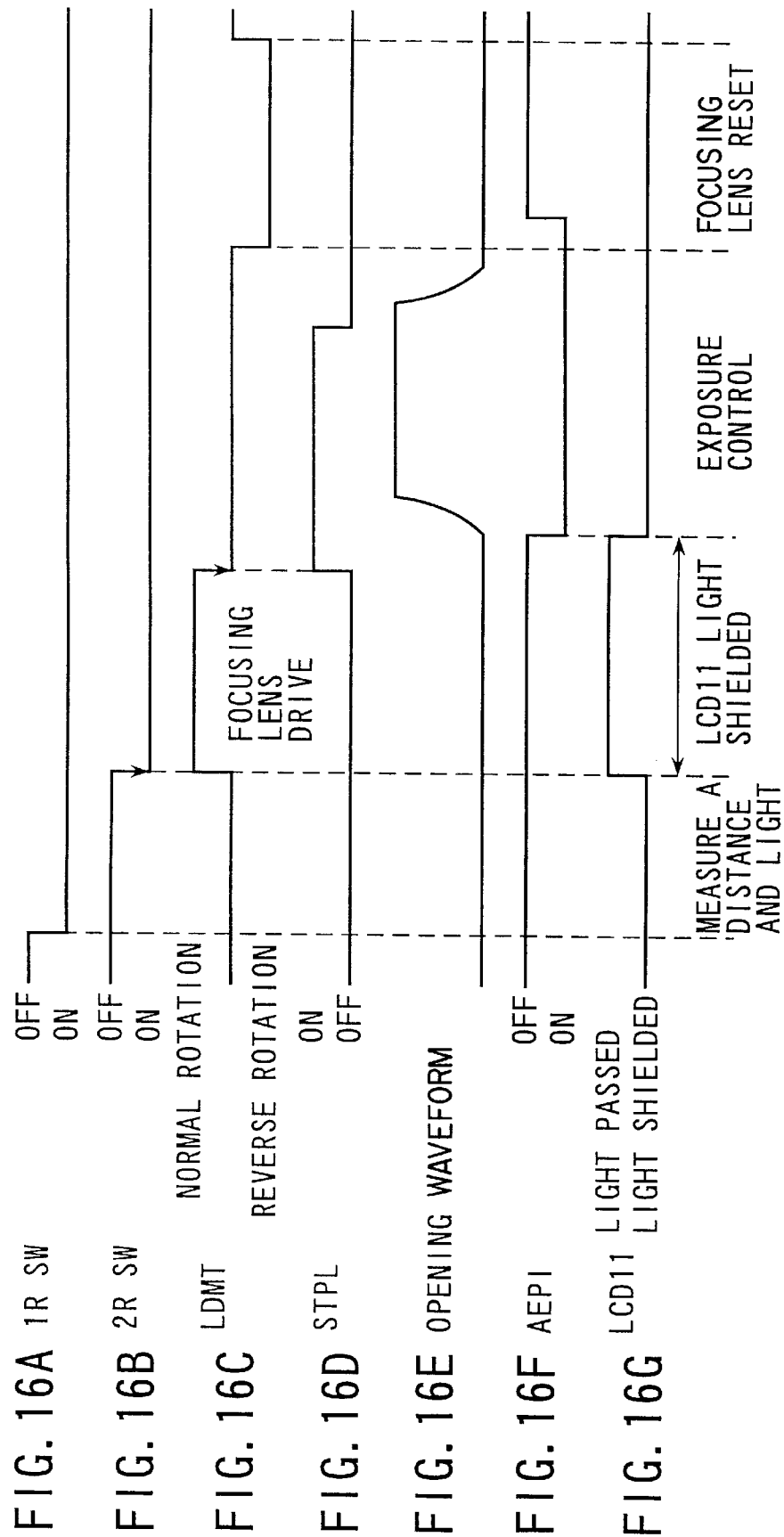
FIGS. 16A to 16G is a timing chart for explaining release processing.

FIG. 15 is a flow chart showing a detail of the above-mentioned shutter control. With the shutter plunger in an ON state, the shutter is beginning to be opened and the AEPI is varied from a "H" state to a "L" state. When, at this time, a time T1 from the ON of the shutter plunger to a change of the AEPI is longer than a time indicated by the "fail" judgment timer, it is judged that a failure is involved. When, on the other hand, the time T1 is shorter than the time indicated, it is judged that no failure is involved and the LCD 11 is varied from the light shielding state to the transmissive state. And the "exposure second" time restoring timer, that is, a timer for counting a time T2 representing the "exposure second" time, is started. When the shutter plunger is turned OFF after the termination of the time T2, then the shutter is beginning to be closed. When the shutter is fully closed, the AEPI is returned again to the "H" state to terminate the shutter control.

In the above-mentioned embodiment, whether or not the light exposure operation is normally done is judged before a substantial light exposure and, only in the case where a light exposure operation is correctly done, the transmittance of the finder optical system is returned back to a transmissive state.

FIGS. 16A to 16G show a timing chart showing a release sequence started with the 1R switch ON. When the 1R switch is turned ON, the measurements of a distance and light are carried out and a wait is made for the 2R switch to be turned ON. When the 2R switch is turned ON, the LCD 11 is set in a light shielding state and focusing drive control is done to drive a picture taking lens to a just-in-focus position. Then a transfer is made to light exposure control and, when, as explained above, a rise of the AEPI showing a light exposure start timing is detected, the LCD 11 in the light shielding state is returned back to the transmissive state and the photographer recognizes that a light exposure is started. When the light exposure control is ended, a focusing lens resetting operation for returning the picture taking lens back to the resetting position is performed and the releasing sequence is ended.

Figure 17:
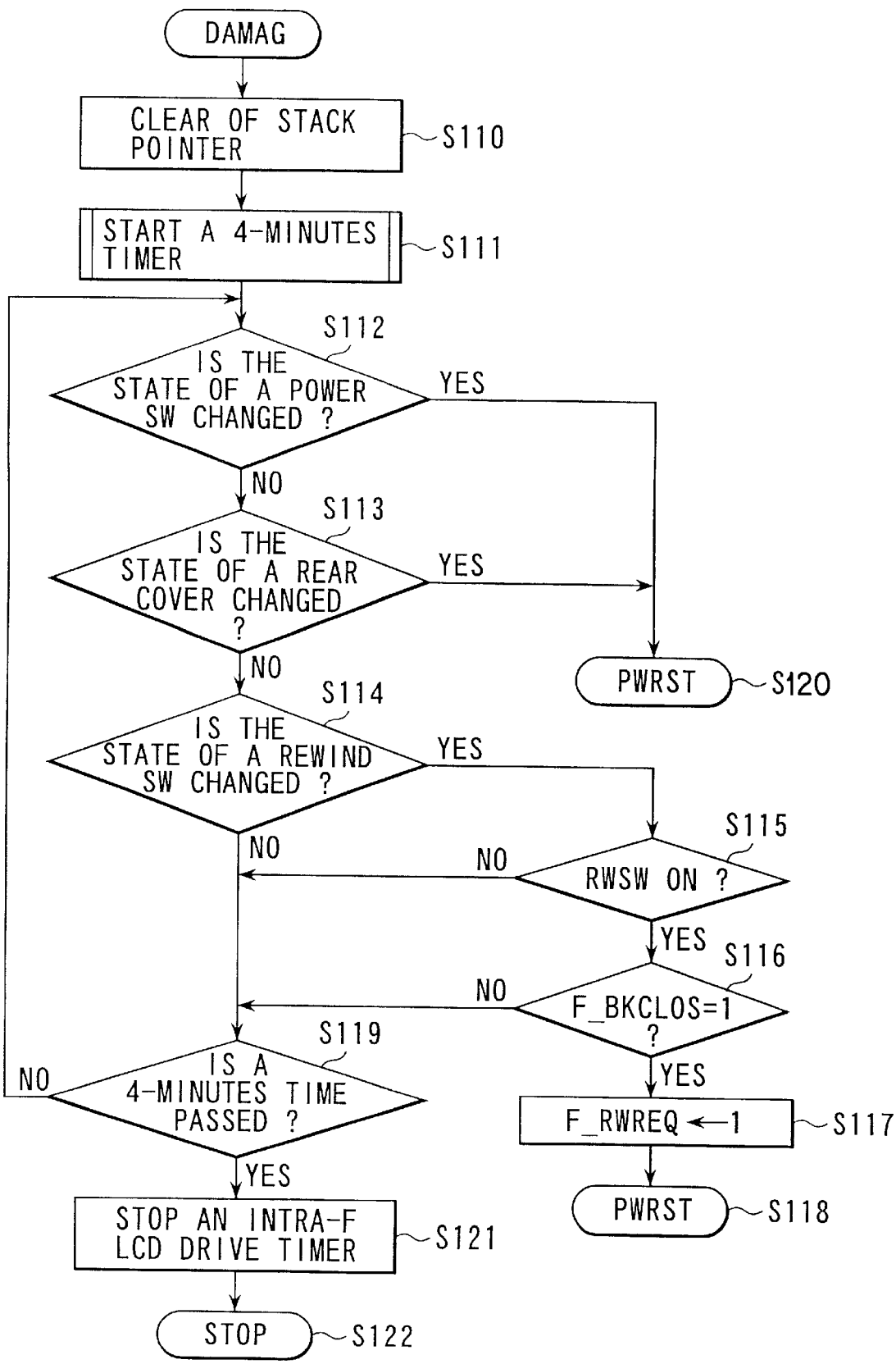
FIG. 17 is a flow chart for explaining a detail of "fail" processing.

Then the subroutine DAMAG (step S102 in FIG. 14) for processing a camera failure will be explained in more detail below with reference to FIG. 17. First, at step S110, the stack pointer is cleared and, at step 111, a 4-minutes timer is started. At step S112, judgment is made as to whether or not the state of the power switch is changed. If YES, control goes to step S120 and a jump is made to the PWRST of step S0 in FIG. 6 and a return is made from the "fail" processing.

If NO at step S112, control goes to step S113 and judgment is made as to whether or not the state of the rear cover is changed. If YES, control goes to step S120 and jump is made to the PWRST of step S0 in FIG. 6 and a return is made from the "fail" processing.

If, at step S113, the state of the rear cover is not changed, control goes to step S114 and, at step S114, judgment is made as to whether or not the state of a rewind switch is changed. If the state of the rewind switch is changed, control goes to step S115 and judgment is made as to whether or not the rewind switch is in an ON state. If it is in the OFF state, control goes to step S119 and, if it is in the ON state, control goes to step S116.

At step S116, judgment is made as to the state of the flag F_BKCLOS representing the state of the rear cover. If F_BKCLOS=0, control goes to step S119. If, on the other hand, F_BKCLOS=1, control goes to step S117 and 1 is set to the flag F_WREQ representing the presence of a rewind request. At step S118, a jump is made to the PWRST of step S0 in FIG. 6 and a return is made from the "fail" processing.

On the other hand, at step S119, judgment is made as to whether or not a 4-minutes time passes. If, here, the 4-minutes time does not pass, control is returned back to step S112, thus creating a "fail" processing loop. If, on the other hand, the 4-minutes time passes, control goes to step S121 and the intra-F LCD drive timer is stopped, thus making a dissipation current minimal. Then control goes to step S122 and the CPU 1 is stopped.

According to the present invention, the photographer not only can recognize a light exposure start timing but also check the state of a subject during a light exposure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:
   a finder optical system;
   a transmissivity variable element arranged in the finder optical system and making a light transmissivity variable;
   a release signal outputting circuit for outputting a release signal;
   a light exposure mechanism for performing a light exposure operation in accordance with the release signal from the release signal outputting circuit; and
   a control circuit for effecting control such that, after the outputting of the release signal but before the starting of the light exposure operation by the light exposure mechanism, the transmissivity of the finder optical system is made lower by the transmissivity variable element.

2. A camera according to claim 1, wherein the transmissivity variable element is comprised of a liquid crystal.

3. A camera according to claim 1, further comprising a judging section which, before a substantial light exposure operation by the light exposure mechanism, judges whether or not the light exposure operation of the light exposure mechanism is correctly performed, and wherein the control circuit effects control such that, only when the judging section judges that the light exposure operation is correctly performed, the transmissivity of the finder optical system is returned back to an initial transmissivity.

4. A camera comprising:
   a finder optical system;
   a transmissivity variable element arranged in the finder optical system and making a light transmissivity variable;
   a release signal outputting circuit for outputting a release signal;
   a distance measuring mechanism for measuring a distance to a subject in accordance with the release signal from the release signal outputting circuit;
   a lens drive mechanism for driving a picture taking lens in accordance with the distance measured by the distance measuring mechanism;
   a light exposure mechanism for effecting a light exposure operation after the driving of the picture taking lens is ended; and
   a control circuit for effecting control such that, during the driving of the picture taking lens, the transmissivity of the finder optical system is made lower by the transmissivity variable element.

5. A camera comprising:
   a finder optical system;
   a transmissivity variable element arranged in the finder optical system and making a light transmissivity variable;
   a release signal outputting circuit for outputting a release signal;
   a shutter;
   a shutter detection circuit for detecting the opening of the shutter and outputting a signal; and
   a control circuit for lowering the transmissivity of the finder optical system by the transmissivity variable element in accordance with the release signal from the release signal outputting circuit and returning the transmissivity of the finder optical system to an initial transmissivity in accordance with the output signal of the shutter detection circuit.

6. A camera according to claim 5, wherein the shutter detection circuit includes a non-contact detection element for detecting the opening of the shutter.

7. A camera comprising:
   a finder optical system;
   a display element arranged in the finder optical system;
   a release signal outputting circuit for outputting a release signal;
   an exposure mechanism for effecting a light exposure operation in accordance with the release signal from the release signal outputting circuit; and
   a control circuit for effecting control such that, after the outputting of the release signal from the release signal outputting circuit but before the start of the light exposure operation by the light exposure mechanism, a display state of the display element is changed.

* * * * *